United States Patent [19]

Wright

[11] 4,288,736

[45] Sep. 8, 1981

[54] CONTROL SYSTEMS FOR ELECTRIC GENERATORS

[75] Inventor: Michael J. Wright, Stamford, England

[73] Assignee: Newage Engineers Limited, Stamford, England

[21] Appl. No.: 28,698

[22] Filed: Apr. 10, 1979

[30] Foreign Application Priority Data

Apr. 12, 1978 [GB] United Kingdom .............. 14359/78

[51] Int. Cl.³ .......................... H02P 9/10; H02G 9/30
[52] U.S. Cl. ...................................... 322/28; 322/60; 322/73; 361/21
[58] Field of Search ....................... 322/28, 60, 73, 22; 361/20, 21

[56] References Cited

U.S. PATENT DOCUMENTS 3,548,288 12/1970 Wyles .
3,599,080 8/1971 Bennett ............................ 322/60 X
3,611,112 10/1971 Lehinhoff ......................... 322/60 X

FOREIGN PATENT DOCUMENTS

1426522 3/1976 United Kingdom .

Primary Examiner—Robert J. Hickey
Attorney, Agent, or Firm—Cushman, Darby & Cushman

[57] ABSTRACT

The excitation winding of an alternator is energized through a silicon controlled rectifier (SCR) from the output of the alternator. The SCR is bypassed by a constant current network to allow the alternator to start up; even with no excitation current, when the alternator output voltage is due to residual magnetism alone, this network can pass a current into the excitation winding, and build the current up gradually to a value above the latching current of the SCR. When this has happened, the SCR can latch on after being fired, and takes over control of the excitation current. Because the network is a constant-current network rather than a purely resistive network, it can be designed to pass sufficient current at low alternator output voltages, without having to dissipate excessive power at higher output voltages. Also, when the output voltage is at its normal operating value, the constant-current network is rendered nonconductive, to avoid the excessive power dissipation which might occur at full voltage. A protective circuit is also included, which is tripped if the voltage on the excitation winding should become excessive as the result of an overload. The tripping takes the form of the turning-on of a programmable unijunction transistor (PUT), which remains on, drawing current from a smoothed supply taken from the alternator output, until the alternator speed is reduced to a very low value. At this low speed, the constant-current network cannot pass sufficient current to allow the alternator output voltage to build up, so that the output voltage does not suddenly increase when the PUT turns off.

15 Claims, 10 Drawing Figures

CONTROL SYSTEMS FOR ELECTRIC GENERATORS

This invention relates to control systems for electric generators. In particular, it relates to a control system for controlling a generator having an excitation winding by which the excitation of the generator is produced or controlled, the excitation winding being energised from the generator output. For example, the excitation winding might be the d.c. field winding of the generator itself, or it might be the field winding of an exciter whose output energises the main generator field. Both the generator and the exciter may be alternators, in which case their outputs must be rectified before being used to energise the field windings.

With such generators, a thyristor may be used to control the energisation of the excitation winding, but it may then be necessary to take special measures to ensure that the output voltage manages to rise to its working value on starting up, since it may not be immediately possible to establish a current through the thyristor which is sufficient for the thyristor to latch into conduction. In particular, a control system may be provided which includes a starting excitation current path leading from an output terminal of the generator to the excitation winding, which path includes means arranged to limit the current in the path to a value which is greater than the latching current of the thyristor. U.S. Pat. No. 3,548,288 discloses one form of generator control system which incorporates a starting excitation current path.

It is also desirable for a generator to be protected against faults, and in particular against overloads. With one possible arrangement, the protection system, having once been tripped, remains tripped until the generator is almost stopped.

It is an object of the present invention to provide a generator control system which includes both a starting excitation current path, and a protection system which remains tripped until the generator speed is too low for the generator output voltage to reappear when the protection system resets.

The invention therefore provides a control system for controlling a generator having an excitation winding by which the excitation of the generator is produced or controlled, the excitation winding being connected, through a thyristor forming part of the control system, to at least one alternating current output terminal of the generator, the output terminal or terminals to which the excitation winding is connected together providing a waveform which is interrupted or changes polarity during each cycle of the waveform, thereby allowing the thyristor to turn off, the control system also including firing means arranged to fire the thyristor at a moment during the waveform which varies with variations in the required excitation, and a starting excitation current path leading from an output terminal or terminals of the generator to the excitation winding, which path includes means arranged to limit the current in the path to a value which is greater than the latching current of the thyristor, and the control system also including protection means which includes a bistable device arranged to be switched from its normal state by a fault or overload condition to a disabling state in which it disables the excitation of the generator, including disabling of the starting excitation current path, and to be maintained in its disabling state by the residual output of the generator until the speed of the generator is reduced to a resetting value, with a corresponding reduction in the generator output to a value at which the current in the starting excitation current path is less than the latching current of the thyristor.

Such an arrangement ensures that, when the protection system resets, the thyristor will remain unlatched, and there is no possibility of a sudden substantial build-up in the generator output voltage. A related invention which is the subject of applicant's copending patent application Ser. No. 28,697, filed Apr. 10, 1980, is directed to the use of a starting excitation path whose conductivity is modulated to limit the current therethrough as the generator voltage rises from starting value to running value.

The bistable device may be a second thyristor, and may be connected, when in its disabling state, to draw a current from a supply derived from the generator output, which supply is smoothed sufficiently for the second thyristor current to remain above its holding value down to the resetting speed of the generator.

The invention may be carried into practice in various ways, but various specific embodiments will now be described by way of example, with reference to the accompanying drawing, of which.

Figure 1:
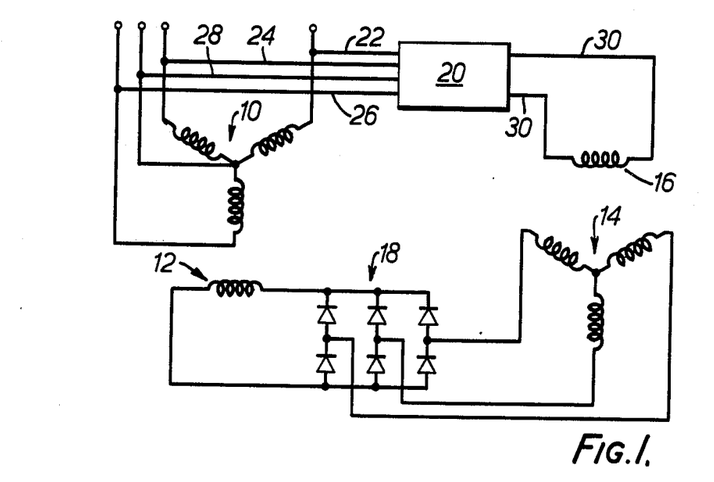
FIG. 1 is a circuit diagram, partly in block form, of a self-excited generator, which is fitted with a voltage control arrangement embodying the present invention.

As can be seen from FIG. 1, the generator comprises a main generator and an exciter; the main generator has a star-connected three-phase stator 10 and a rotating field winding 12, while the exciter has a three phase rotor winding 14 and a stationary field winding 16. The main field winding 12 and the exciter rotor 14 are mounted on the same shaft, and are connected by a bridge rectifier 18, also mounted on the same shaft, so that the main field 12 will be energised by the exciter.

Figure 2A:
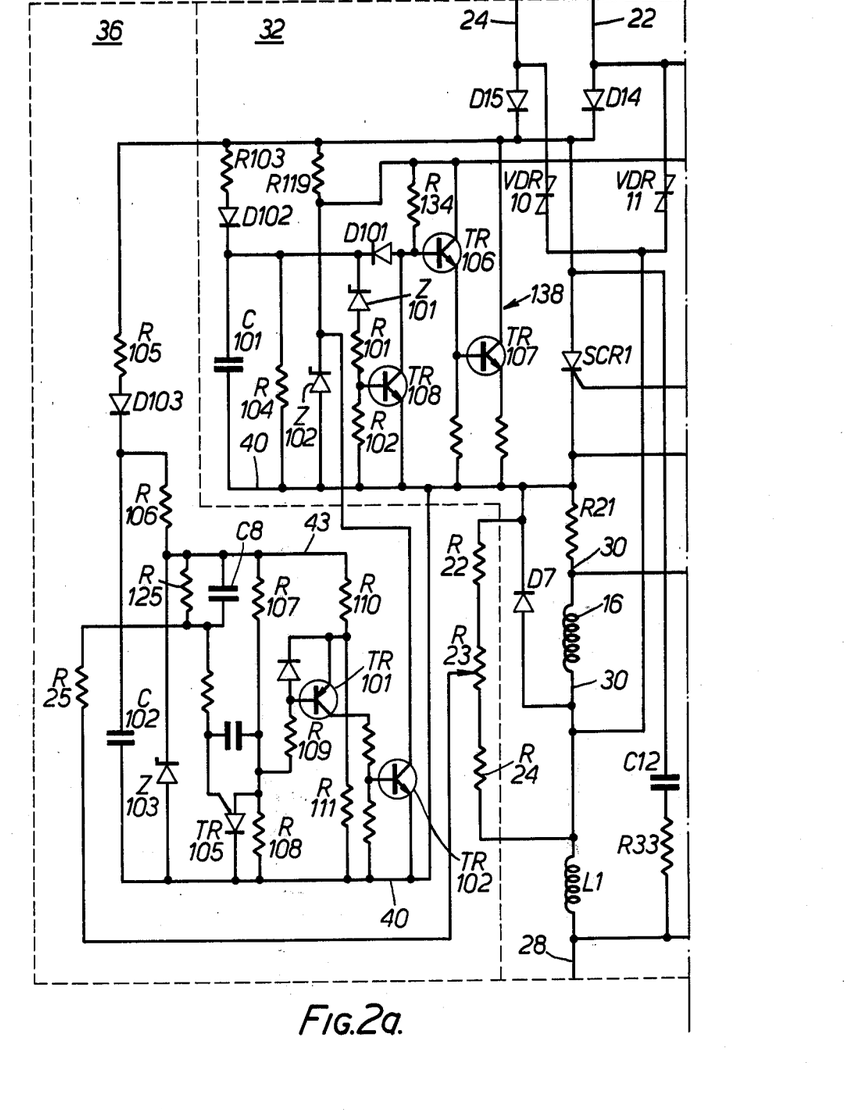
FIGS. 2a, 2b is a detailed circuit diagram of a voltage control arrangement used in FIG. 1.
Figure 2B:
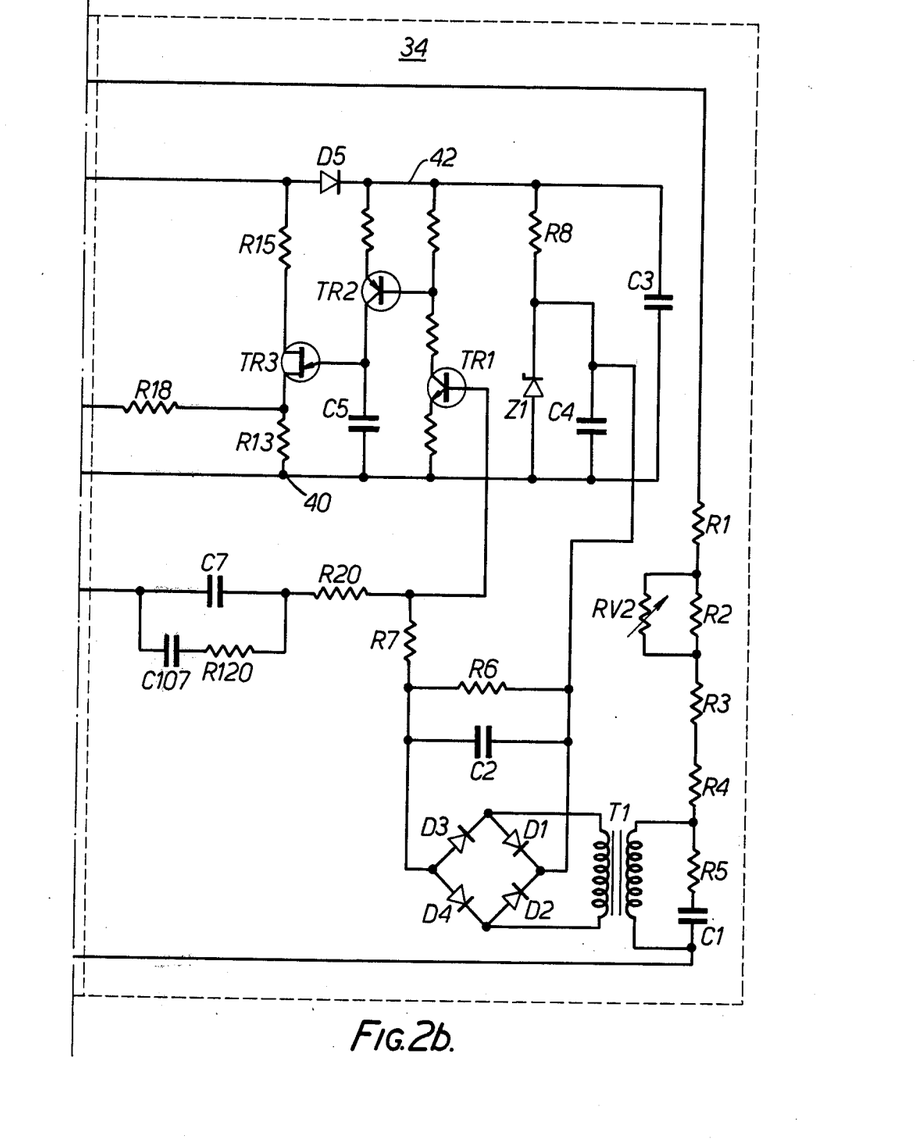

The exciter field winding 16 derives its power from the output of the main generator, through a field control circuit which is generally shown at 20, and which acts to regulate the output voltage of the generator. The field control circuit 20 also requires power for its own operation, and this power is also drawn from the main generator; thus, as can be seen from FIGS. 1 and 2, the only external connections which are made to the field control circuit 20 are two phase connections 22, and 24 and a neutral connection 28 from the main generator stator 10, and two connections 30 to the exciter field 16.

The field control circuit 20 may be considered as consisting of three main sections, namely: a main section 32 which is directly concerned with the energisation of the exciter field 16, by means of a silicon controlled rectifier SCR1; a triggering section 34 which is responsible for firing SCR1 at the appropriate moment during each cycle of the main generator output, in dependence, at least primarily, on the generator output voltage; and a protection section 36 which is responsible for disabling the field control circuit 20 if the voltage across the exciter field 16 should become excessive, indicating that the generator is overloaded. These three sections of the circuit 20 will now be described in greater detail.

Figure 4:
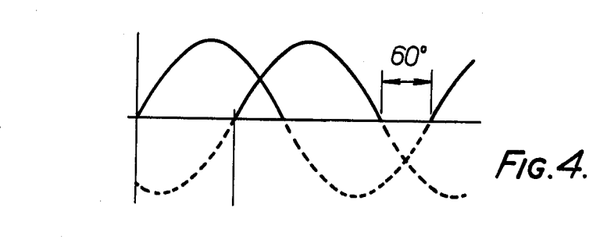
FIGS. 4, 5 and 6 illustrate the waveforms appearing at certain points in the circuit of FIG. 3.

The anode of SCR1 is connected to the two phase connections 22 and 24 through two diodes D14 and D15, so that the voltage applied to SCR1 during each cycle of the output consists of two positive half-cycles, with an overlap of 60° and a gap of 60° between them. This waveform is illustrated in FIG. 4. The exciter field 16 is connected between SCR1 cathode and the neutral connection 28, in series with a current sensing resistor R21, and a freewheel diode D7 is also connected between these points. The 60° gap in the waveform applied to SCR1 therefore allows SCR1 to turn off on each cycle of the generator output. The triggering section 34 then fires SCR1 again, with a variable delay from the end of the 60° gap. In this way, the mean voltage applied to the exciter field 16 can be varied; because the field winding is highly inductive, the field current will be substantially constant during any one cycle.

In addition to the path through SCR1, there is a second path for current to flow from the diodes D14 and D15 to the exciter field 16, through a constant current network 138. This path passes only a comparatively small current, for a purpose which will be explained later.

The circuit also includes two non-linear resistors VDR10 and VDR11, an inductor L1 in series with the neutral connection 28, and an R-C combination C12, R33 between SCR1 anode and the neutral connection 28. These components are provided to protect the components of the field control circuit 20 against transient voltages.

As can be seen from FIG. 2, the various sections of the circuit 20 have a common negative supply rail 40 which is connected to SCR1 cathode. The triggering section 34 includes a smoothed positive supply rail 42, which is energised from the diodes D14 and D15, through further components R119 and D5, and its voltage is stabilised by a zener diode Z102 and smoothed by a capacitor C3. This section also includes a voltage divider chain R1, R2, RV2, R3, R4, C1 and R5, which is connected across one of the phases of the main generator output. The voltage which appears across C1 and R5 is directly proportional to the generator output voltage, but is also dependent on the generator frequency, because of the presence of the capacitor C1 in an otherwise purely resistive divider chain; as the generator output frequency falls, the output voltage of the divider chain rises. This output voltage is applied, through a transformer T1, to a bridge rectifier D1 to D4, whose output is loaded by a resistor R6, and smoothed by a capacitor C2, to provide a steady d.c. voltage which is representative of generator output voltage and frequency. This voltage is electrically subtracted from a reference voltage which is established by a combination of a zener diode Z1, a capacitor C4 and a resistor R8, which combination is energised from the positive and negative rails 42 and 40. The resulting difference in voltage is applied through a resistor R7 to a direct-coupled amplifier including two transistors TR1 and TR2. The collector current of TR2 forms the charging current for a timing capacitor C5, which determines the delay between the end of the 60° gap in the voltage applied to SCR1 and the firing of SCR1. Because of the voltage subtraction which takes place before the transistor TR1, this charging current will increase with a fall in the generator output voltage, reducing the delay in firing SCR1, and increasing the mean voltage applied to the exciter field 16, thereby tending to offset the fall in output voltage, to maintain the output voltage nearly constant.

The voltage on the timing capacitor C5 is applied to the emitter of a unijunction transistor TR3, which has a base-1 resistor R13 and a base-2 resistor R15. It will be seen from FIG. 2 that the resistor R15 is not connected to the main smoothed positive rail 42, but to the anode of the diode D5. This means that, during the 60° gap in the voltage supplied by the diodes D14 and D15, the interbase voltage on TR3 will be zero, because the diode D5 will isolate TR3 from the smoothing capacitor C3, and TR3 will therefore keep C5 discharged. As soon as the interbase voltage rises sufficiently after the end of the 60° gap, C5 will begin to charge, and after a delay sufficient for the voltage on C5 to reach about 75% of the voltage across the zener diode Z102, the unijunction transistor TR3 will fire, generating a voltage pulse across its base-1 resistor R13. This pulse is applied through a resistor R18 to the gate of SCR1, thereby firing SCR1 with the necessary delay from the end of the 60° gap. After SCR1 has been fired, the interbase voltage of the transistor TR3 is again zero, and only rises again after the next 60° gap.

The base of the transistor TR1 is not only connected to the resistor R7, but is also connected through a network of resistors R20 and R120 and capacitors C7 and C107 to the negative end of the current sensing resistor R21. Under steady conditions, this has no effect, other than that the capacitors help to smooth the voltage applied to the transistor TR1. However, when conditions change, for example if the load on the generator increases, the current in the exciter field 16 will tend to increase, and this results in a corresponding increase in the voltage across the resistor R21. Thus the voltage at the negative end of R21 will go more negative with respect to the negative rail 40 of the triggering section 34, and this change will result in the capacitors C7 and C107 drawing a temporary charging current from the base of transistor TR1, thereby reducing the charging current supplied to the timing capacitor C5 and limiting the rate of change of current in the exciter field 16. In this way, the stability and performance of the field control circuit is improved.

As mentioned above, a constant current network 138 is connected to provide a current path to the exciter field 16 additional to that through SCR1. This network essentially comprises a pair of transistors TR106 and TR107 which are connected as a cascaded pair of emitter followers. The base of the first transistor TR106 of the pair is connected through a resistor R134 to the positive end of the zener diode Z102, while the collector of this transistor is directly connected to the same point. Thus, with the circuit as so far described, the voltage appearing at the emitter of the second transistor TR107 will be equal to the voltage at the positive end of the zener Z102, less the base-emitter voltage drops of the two transistors TR106 and TR107. These conditions prevail at very low generator output voltage, but as the output voltage rises, current begins to be diverted from the base of the transistor TR106 to the negative rail 40 through a network consisting of a transistor TR108, a diode D101, a zener diode Z101 and two resistors R101 and R102. This network only begins to conduct when the base voltage of the transistor TR106 has risen somewhat above the zener voltage of the diode Z101, so that current flows through the diodes D101 and Z101 and the resistor R101 to the base of the transistor TR108. As the output voltage rises further, the transistor TR108 will conduct more and more heavily, so that the base voltage applied to the transistor TR106 will remain more or less constant, and therefore the currents passed by the two transistors TR106 and TR107 will remain more or less constant.

If the constant current network 138 were not provided, the main generator output voltage would be low on starting up, because there would be no current in the exciter field, and therefore the exciter field strength would be due to residual magnetism only. Under these conditions, although SCR1 might receive a firing signal from the triggering section 34, the current in SCR1 would not be able to reach the latching current to SCR1 sufficiently quickly for SCR1 to turn on and latch on, and therefore the exciter field current and the main generator output voltage would be unable to build up to their full working levels.

The constant current network 138 passes a current through the exciter field 16 except during the 60° gap in the waveform provided by the diodes D14 and D15. During this gap, the exciter field current freewheels through the diode D7. Under starting conditions, the firing signal to SCR1 will occur with only a slight delay from the end of the 60° gap in the voltage applied to SCR1 anode; immediately before firing, therefore, the exciter field current will be freewheeling through D7. On firing SCR1, this current will transfer from D7 to SCR1, and, at least after the generator has been running for a few cycles to build up exciter field current to the value determined by the network 138, SCR1 will pass a current above its latching current and will remain on until the next gap of 60° in the voltage applied to SCR1 anode. The generator output voltage will then quickly build up to its working value, and as it does so, the firing signal to SCR1 will be retarded, to regulate the mean voltage applied to the exciter field 16 as necessary. At any instant when SCR1 is conducting, the voltage across the network 138 will be insufficient to pass any substantial current through the network, and therefore the power dissipated in the constant current network 138 will be negligible as long as SCR1 is fired and latched immediately after the 60° gap. However, under normal operating conditions, the firing signal to SCR1 will be considerably delayed, and under these conditions, the network 138 would pass its constant current into the exciter field 16 from the moment when the anode of SCR1 becomes sufficiently positive to bias the network 138 correctly until SCR1 fires. During this period, an appreciable amount of power could be dissipated in the network 138. To avoid the need for the network 138 to be designed to be able to dissipate the maximum power which can arise in this way, it is arranged to become non-conductive as the machine output voltage approaches its normal working value. To achieve this, a resistor R103 and a diode D102 are connected in series from the anode of SCR1 to the junction between the diode D101 and the zener diode Z101, while a resistor R104 and a capacitor C101 are connected from this junction to ground. The resistor R104 will divert some current from the base of the transistor TR106 even before the transistor TR108 begins to conduct, but this does not affect the fundamentals of the operation of the constant current network 138. A certain amount of charge will be supplied to the capacitor C101 through the resistor R103 and diode D102 during each output cycle, provided that the output voltage is high enough to forward bias the diode D102 for part of the cycle. When the output voltage is high enough that the amount of charge supplied in this way is greater than the amount of charge lost through the resistor R104 (and also through the zener diode Z101), the voltage across the capacitor C101 will increase, so that the diode D101 becomes reverse biased, and the conductivity of the transistor TR108 is no longer dependent on its collector voltage. When the generator output voltage is at its normal working value the transistor TR108 will conduct so heavily that the transistors TR106 and TR107 are both cut-off, and dissipate no power.

The protection section 36 comprises a programmable unijunction transistor (PUT) TR105, which continuously compares a voltage derived from the exciter field voltage with a reference voltage, and disables the rest of the field control circuit 20 if the former voltage should exceed the reference voltage. The protection section 36 includes its own positive supply rail 43, whose voltage is derived from the diodes D14 and D15 through a resistor R105, a diode D103 and a further resistor R106. A zener diode Z103 and a capacitor C102 are provided to stablise and smooth this positive supply rail. The voltage derived from the exciter field voltage is applied to the gate of the PUT TR105, by means of an adjustable voltage divider chain R22, R23, R24, and an integrating R-C circuit consisting of R25, R125 and C8, which acts as a level shifter and a further voltage divider. Because of the delaying action of this integrating circuit, the protection section will not respond very quickly to a slight over-voltage on the exciter field 16, and therefore the field control circuit will not be disabled by a slight overload on the generator, provided that the overload is only temporary, as for example when a motor supplied from the generator is started. However, a more severe overload will produce a greater overvoltage on the exciter field 16, and this will quickly result in the protection section 36 disabling the rest of the field control circuit 20.

The reference voltage is derived from the positive supply rail 43 by a potential divider R107, R108 whose negative end is connected to the negative rail 40, so that the reference voltage goes positive with respect to the negative rail. The gate voltage on the PUT TR105 also goes positive with respect to the negative rail 40, but is derived from the voltage at the negative end of the exciter field winding 16. The necessary level shifting is performed by the potential divider R25, R125, which has one end connected to the positive rail 43.

As mentioned above, the protection section 36 acts to disable the rest of the field control circuit 20 when an overload occurs; it does this in the following manner. When the gate voltage of the PUT TR105 falls more than about 0.7 volts below the reference voltage set by the potential divider R107, R108, TR105 fires, so that the anode voltage of TR105 falls to be only slightly above the voltage on the negative rail 40. The anode of TR105 is connected through a resistor R109 to the base of a transistor TR101 whose emitter is connected to a further potential divider R110, R111 connected between the power supply rails 40 and 43. The voltage provided by the potential divider R110, R111 is such that the transistor TR101 is off as long as the PUT TR105 has not fired, but switches on when TR105 fires. Turn-on of the transistor TR101 in turn turns on a transistor TR102, which shunts the zener diode Z102, thereby disabling both the triggering section 34, and the constant current network 138. Under these conditions, the exciter field current will be reduced to zero, and the generator output will fall to a voltage which is determined by the residual field magnetism. This voltage is sufficient to maintain a current through TR105 which is greater than the holding current of TR105, and therefore the generator must be stopped, or almost stopped, for TR105 to turn off, before it can again develop its proper output voltage. The value to which the generator speed must be reduced for TR105 to turn off is determined primarily by the values of C102, R106 and R107, and by the holding current of TR105, and these values are so selected that, when TR105 turns off, the generator output voltage is not sufficient to pass through the network 138 a current which is greater than the latching current of SCR1. This means that, when the generator is slowed down after the protection section 36 has disabled the field control circuit, there is no possibility of the generator output voltage building up again immediately after TR105 turns off; the output voltage will only be that which is due to residual magnetism in the exciter field, until the generator is speeded up again.

Figure 3A:
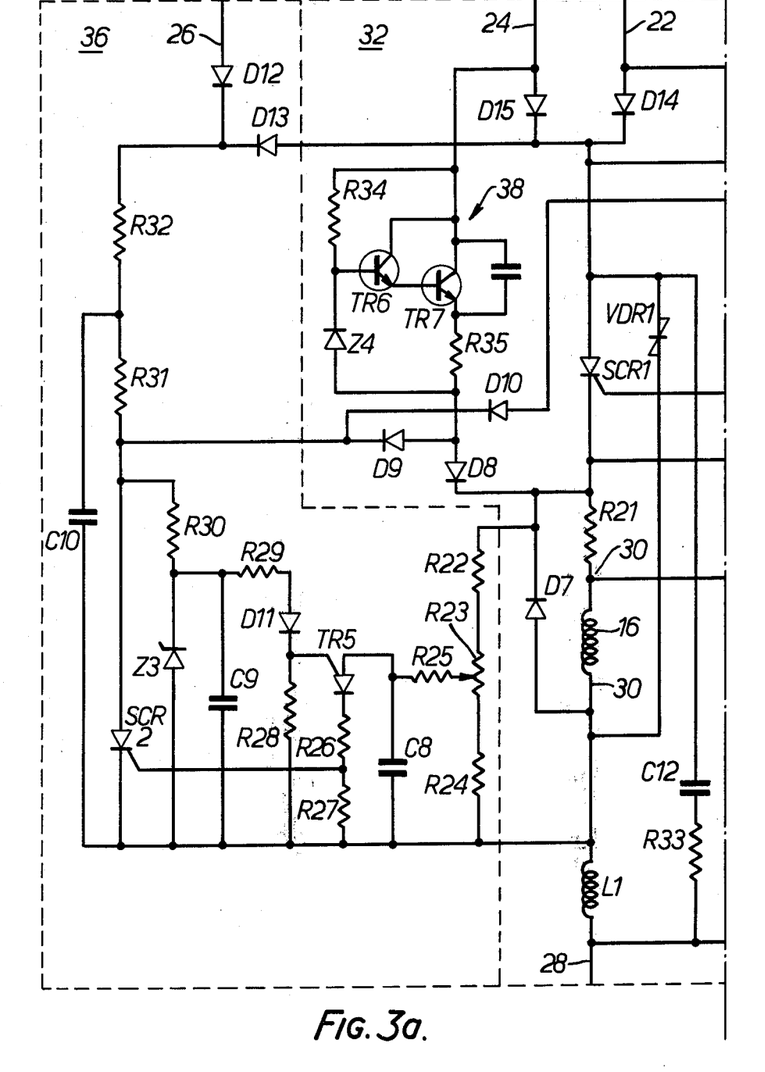
FIG. 3a, 3b is a detailed circuit diagram of an alternative voltage control arrangement which can be used in FIG. 1.
Figure 3B:
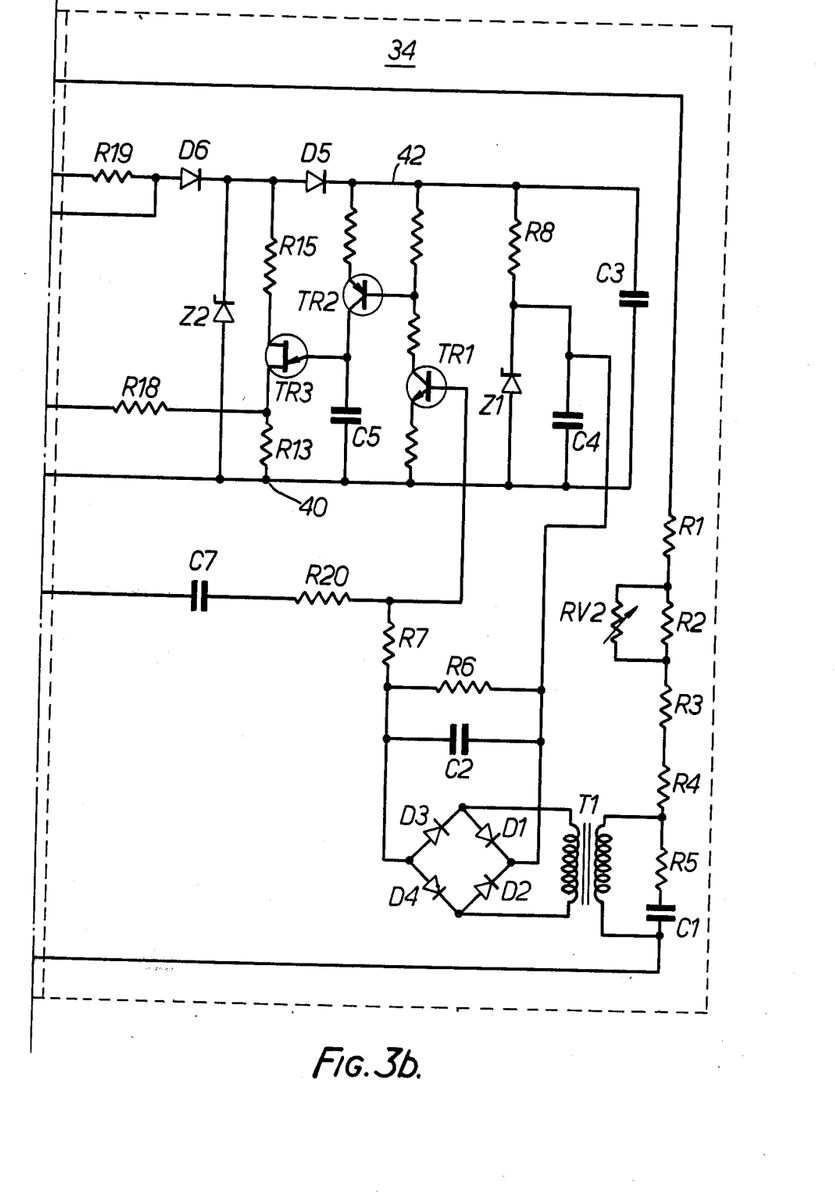

The field control circuit shown in FIG. 3 has large parts which are similar or identical to the corresponding parts of FIG. 2; the same reference numerals are used for corresponding components. The following description will be confined to those parts where major differences occur.

Instead of the constant current network 138, a two-terminal constant-current network 38 is used, which is connected, in series with a diode D8, between the cathode of SCR1 and the phase connection 24. This network essentially comprises a zener diode Z4 which is biased through a resistor R34 to provide a reference voltage, which is applied to the input of a Darlington pair of transistors TR6 and TR7 working an an emitter follower, with an emitter load resistor R35. Thus the current through the network will be determined primarily by the ratio of the zener voltage of Z4 to the resistance of R35, so long as the voltage across the network is large enough to bias Z4 into its avalanche region.

Figure 5:
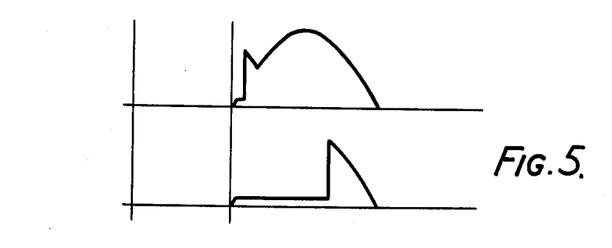
Figure 6:
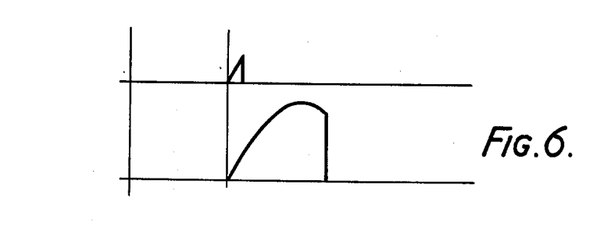

The constant current network 38 passes a current through the exciter field 16 during those half-cycles for which the phase connection 24 is positive. The phase connections 22 and 24 are so arranged that the voltage on the connection 22 leads that on the connection 24 by 120°. At any instant when SCR1 is conducting, the voltage across the network 38 will be insufficient to pass any substantial current through the network, and therefore, provided the firing signal to SCR1 is not delayed by more than 120° from the end of the 60° gap (that is to say, provided that SCR1 is conducting at any moment when the phase connection 24 is positive), the power dissipated in the constant current network 38 will be negligible. However, under normal operating conditions, the firing signal to SCR1 may be delayed by more than 120°, and under these conditions, the network 38 will pass its constant current into the exciter field 16 from the moment when the phase connection 24 becomes sufficiently positive to bias the network 38 correctly until SCR1 fires. During this period, an appreciable amount of power will be dissipated in the network 38, and the average dissipation will increase with an increase in the firing delay of SCR1. FIG. 5 shows the waveform which is applied to the exciter field 16 for two different firing delays of SCR1, while FIG. 6 shows the corresponding waveforms which appear across the network 38.

Because the positive half-cycle from the phase connection 24 is the last half-cycle to be applied to SCR1 before the 60° gap during which SCR1 turns off, the firing of SCR1 will never be delayed right to the end of this half-cycle, and therefore the network 38 will never have to dissipate power during a full half-cycle (except temporarily, during starting-up). It will be realised that, if the network 38 were instead fed from the phase connection 22, it would be possible that the network 38 would have to dissipate power for a full half-cycle, and this would mean that the network would have to be designed to be able to dissipate a higher average power.

As in FIG. 2, the protection section 36 includes a PUT, this time referenced TR5, but in this case, the voltage derived from the exciter field voltage (by voltage divider R22, R23 and R24 and R-C circuit R25 and C8) is applied to the anode of TR5, while a reference voltage is applied to the trigger of TR5. No level shifting is performed on the voltage provided by the voltage divider R22, R23, R24; instead, the negative supply rail for the protection section is separated from the negative supply rail 40 for the triggering section 34, and connected to the negative end of the exciter field winding 16. This means that the voltage provided by the voltage divider goes more positive with increasing field voltage, relative to the reference voltage, not more negative as in FIG. 2, and this is why the trigger and anode connections are interchanged between FIG. 2 and FIG. 3.

The reference voltage is developed across a zener diode Z3, whose negative end is connected to the negative rail of the protection section, so that the reference voltage, like the exciter field voltage, goes positive with respect to the neutral line. The zener diode Z3 is biased through resistors R30 and R31 from a smoothed power supply comprising a capacitor C10, a limiting resistor R32, and two diodes D12 and D13, which work in conjunction with the diodes D14 and D15 to provide a rectified supply derived from all three generator output phases. For this reason, a third phase connection 26 is required between the main generator output and the field control circuit 20; this connection is shown in FIG. 1, although it is not required in FIG. 2. The voltage across Z3 is applied to the gate of PUT TR5 through a small resistor R29 and a diode D11; the gate of TR5 is also connected through a bias resistor R28 to the negative rail, so that the diode D11 is kept slightly forward biased. The gate voltage of TR5 will therefore be less than the reference voltage by the forward voltage drop of D11, which is approximately equal to and varies with temperature in the same manner as the anode-to-gate voltage drop of the PUT TR5.

As mentioned above, the protection section 36 acts to disable the rest of the field control circuit 20 when an overload occurs; it does this in the following manner. When the anode voltage of the PUT TR5 exceeds the reference voltage set by the zener diode Z3, TR5 fires and discharges the capacitor C8 through its cathode circuit, which includes two resistors R26 and R27 in series. The resulting voltage pulse which occurs at the junction of these two resistors is used to fire a 'crowbar' silicon controlled rectifier SCR2, which is connected, in series with the resistor R31, across the bias power supply for the zener diode Z3. In addition, the anode of SCR2 is connected through a diode D9 to the negative side of the constant current network 38, and through a diode D10 to the anode of the diode D6 through which power is supplied to the triggering section 34. Under normal conditions, both the diodes D9 and D10 are reverse biased, and have no effect, but when SCR2 is fired, these diodes conduct, allowing SCR2 to cut off not only the voltage supply to the gate of the PUT TR5, but also the supply to the triggering section 34, and the current supplied to the exciter field 16 through the constant current network 38. Under these conditions, the exciter field current will be reduced to zero, as with the arrangement of FIG. 2. In a similar manner to that described with reference to FIG. 2, the component values which determine the value to which the generator speed must be reduced for SCR2 to turn off (primarily the values of C10 and R31, and the holding current of SCR2) are so selected that, when SCR2 turns off, the generator output voltage is not sufficient to pass through the network 38 a current which is greater than the latching current of SCR1. This again means that, when the generator is slowed down after the protection section 36 has disabled the field control circuit, there is no possibility of the generator output voltage building up again immediately after SCR2 turns off; the output voltage will only be that which is due to residual magnetism in the exciter field, until the generator is speeded up again.

Figure 7:
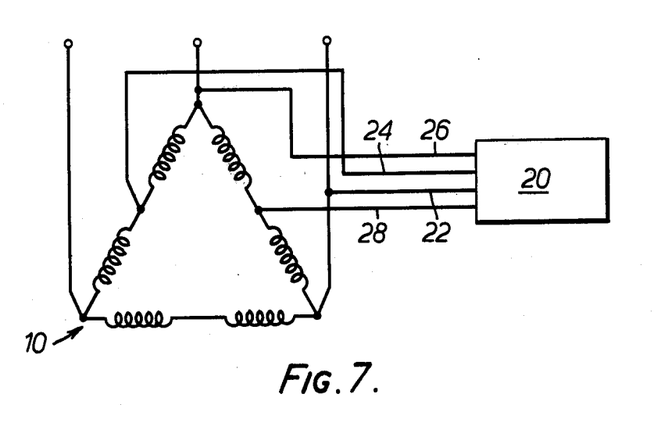
FIGS. 7 and 8 show two alternative arrangements of the stator windings of the generator of FIG. 1.

In the Examples described above, the stator 10 is star-connected. However, either version of the field control circuit 20 can also be used with other arrangements of the stator connections. Thus, FIG. 7 shows a delta-connected stator, in which each phase comprises two similar windings in series. In this case, there is no neutral point of the stator to which the 'neutral' connection 28 can be connected; instead, it is connected to the mid-point of one of the phases. The two connections 22 and 24 are connected, respectively, to an adjacent phase output connection of the stator, and to the midpoint of one of the other phases, in such a way that the voltage on the lines 22 and 24, relative to the line 28, have the same phase relating as in the case of FIG. 1. The remaining connection 26 is connected to one of the other phase output connections of the stator; this results in the connection 26 having a phase shift of only 180° from the connection 22, rather than 240°, as with FIG. 1, but this does not substantially affect the operation of the field control circuit 20.

Figure 8:
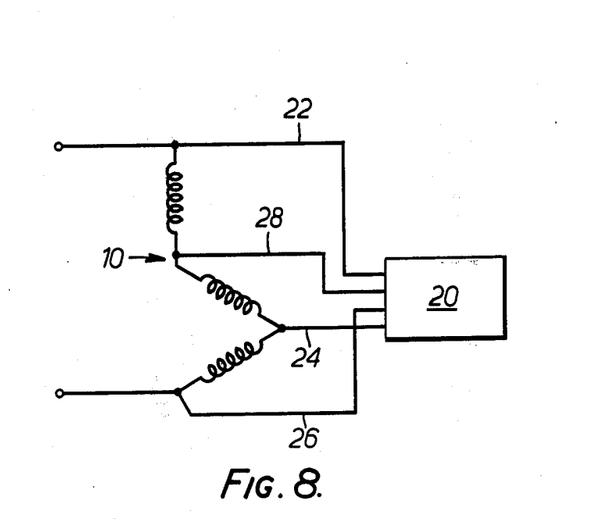

FIG. 8 shows a further arrangement of the stator connections, in which the three phase windings are connected in series to provide a single phase output. The 'neutral' connection 28 is connected to one of the connections between phase windings; the voltage on this connection is the average of the voltages on the two ends of the series chain. The connections 22 and 26 are connected to the two ends of the chain, and therefore their voltages, relative to the connection 28, are 180° out of phase; the remaining connection 24 is connected to the remaining point of the chain, and therefore, as can be deduced from FIG. 8, its voltage lags behind the voltage on the connection 22 by 120°. In other words, the phase relationships in FIGS. 7 and 8 are the same.

The arrangements of FIGS. 1, 7 and 8 can all be obtained from a single stator construction, by providing two windings for each phase, with separate terminals for each winding which can be connected together as required.

What I claim as my invention and desire to secure by Letters Patent is:

1. In a control system including a thyristor for controlling a generator having an excitation winding by which the excitation of the generator is produced or controlled, the excitation winding being connected, through the thyristor forming part of the control system, to at least one alternating current output terminal of the generator, the output terminal or terminals to which the excitation winding is connected together providing a waveform which is interrupted or changes polarity during each cycle of the waveform, thereby allowing the thyristor to turn off, the control system also including firing means arranged to fire the thyristor at a moment during the waveform which varies with variations in the required excitation, and a starting excitation current path leading from an output terminal or terminals of the generator to the excitation winding, which path includes means arranged to limit the current in the path to a value which is greater than the latching current of the thyristor, the improvement comprising protection means which includes a bistable device arranged to be switched from its normal state by a fault or overload condition to a disabling state in which it disables the excitation of the generator, including disabling of the starting excitation current path, and to be maintained in its disabling state by the residual output of the generator until the speed of the generator is reduced to a resetting value, with a corresponding reduction in the generator output to a value at which the current in the starting excitation current path is less than the latching current of the thyristor.

2. A control system as claimed in claim 1 in which the bistable device comprises a second thyristor.

3. A control system as claimed in claim 2 in which the second thyristor is a silicon controlled rectifier.

4. A control system as claimed in claim 2 in which the second thyristor is a programmable unijunction transistor.

5. A control system as claimed in claim 2, in which the second thyristor is connected, when in its disabling state, to draw a current from a supply derived from the generator output, which supply is smoothed sufficiently for the second thyristor current to remain above its holding value down to the resetting speed of the generator.

6. A control system as claimed in claim 5 in which second thyristor is also connected, when in its disabling state, to divert from the excitation winding any current passing through the starting excitation current path.

7. A control system as claimed in claim 5 in which the second thyristor is also connected, when in its disabling state, to shunt the power supply to the firing means for the first-mentioned thyristor.

8. A control system as claimed in claim 1 in which the bistable device is arranged to be switched to its disabling state when the voltage across the excitation winding exceeds a predetermined value.

9. A control system as claimed in claim 8 in which the bistable device is a programmable unijunction transistor which is arranged to compare the voltage across the excitation winding with a reference voltage, and to turn on, thereby reaching its disabling state, when the former voltage exceeds the latter voltage.

10. A control system as claimed in claim 8 in which the protection means includes a programmable unijunction transistor arranged to compare the voltage across the excitation winding with a reference voltage, and to be fired when the former exceeds the latter, and on such firing, to switch the bistable device to its disabling state.

11. A control system as claimed in claim 1 which is arranged to monitor the generator output voltage, and to derive therefrom a signal representing the excitation required to offset changes in output voltage from a set value.

12. A control system as claimed in claim 11 which is also arranged to monitor the rate of change of current in the excitation winding, and to modify the said derived signal in dependence on the said rate of change, in such a sense as to limit the said rate of change.

13. A control system as claimed in any of claims 1 to 12 in which the first-mentioned thyristor is a silicon controlled rectifier.

14. A control system including a thyristor for controlling a generator having an excitation winding by which the excitation of the generator is produced or controlled, the excitation winding being connected, through the thyristor forming part of the control system, to at least one output terminal of the generator, the control system also including firing means arranged to control the thyristor to conduct during such periods that the mean voltage applied to the excitation winding by the thyristor varies with variations in the required excitation, and a starting excitation current path leading from an output terminal or terminals of the generator to the excitation winding, and the control system also including protection means which includes a bistable device arranged to be switched from its normal state by a fault or overload condition to a disabling state in which it disables the excitation of the generator, and to be maintained in its disabling state by the residual output of the generator until the speed of the generator is reduced to a resetting value, with a corresponding reduction in the generator output to a value at which the current in the starting excitation current path is less than the latching current of the thyristor.

15. A control system as claimed in claim 6 in which the second thyristor is also connected, when in its disabling state, to shunt the power supply to the firing means for the first-mentioned thyristor.

* * * * *